United States Patent Office

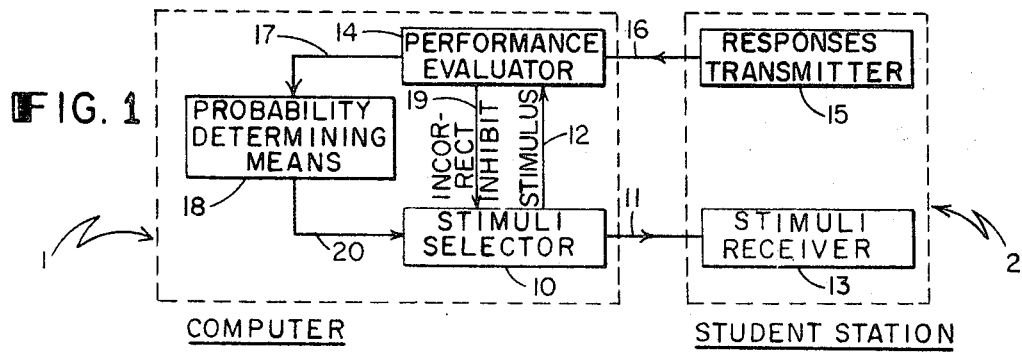
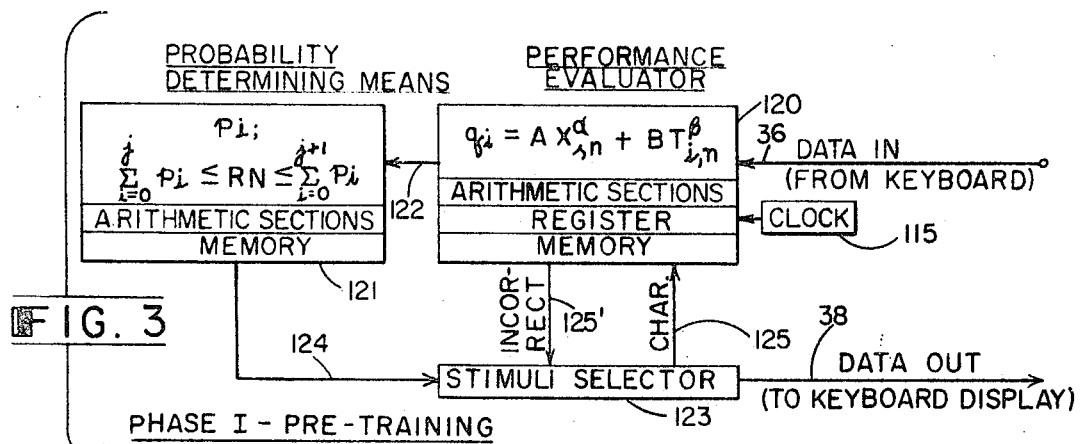
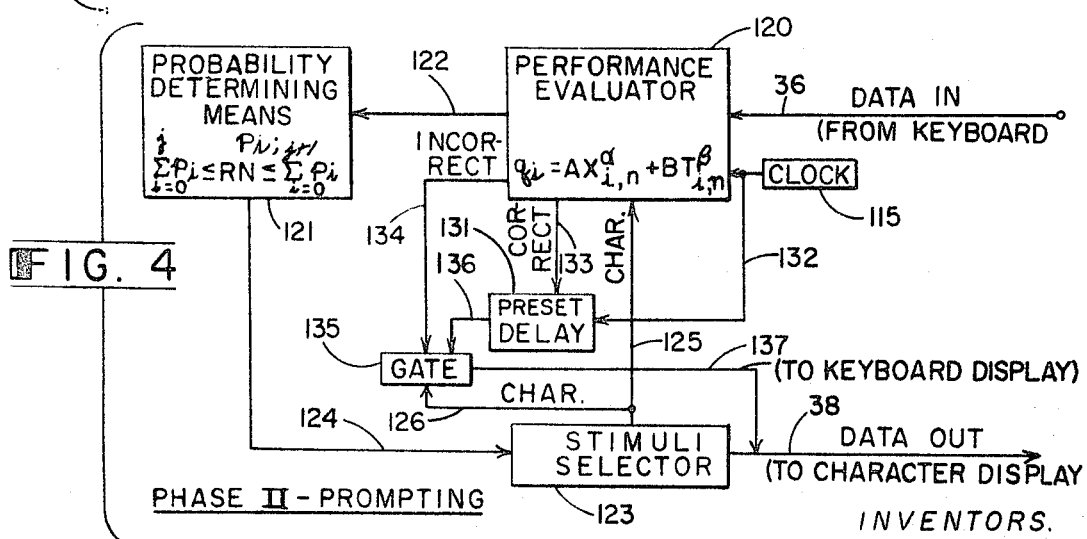

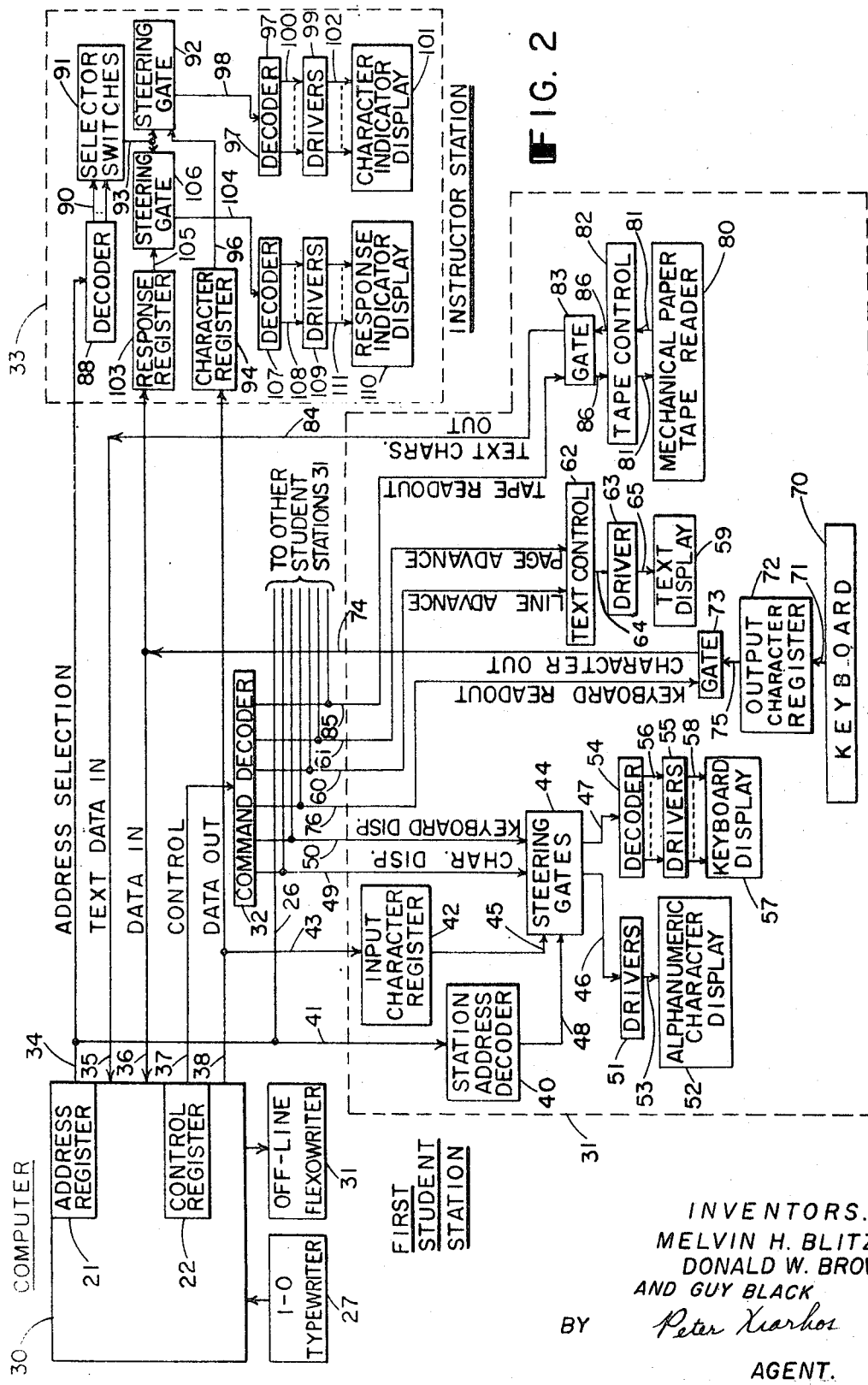

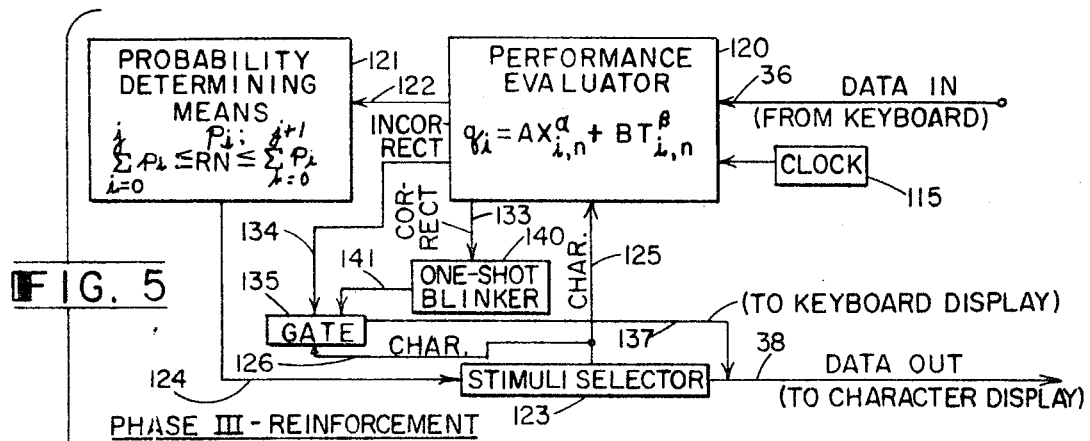
FIG. 5 PHASE III - REINFORCEMENT
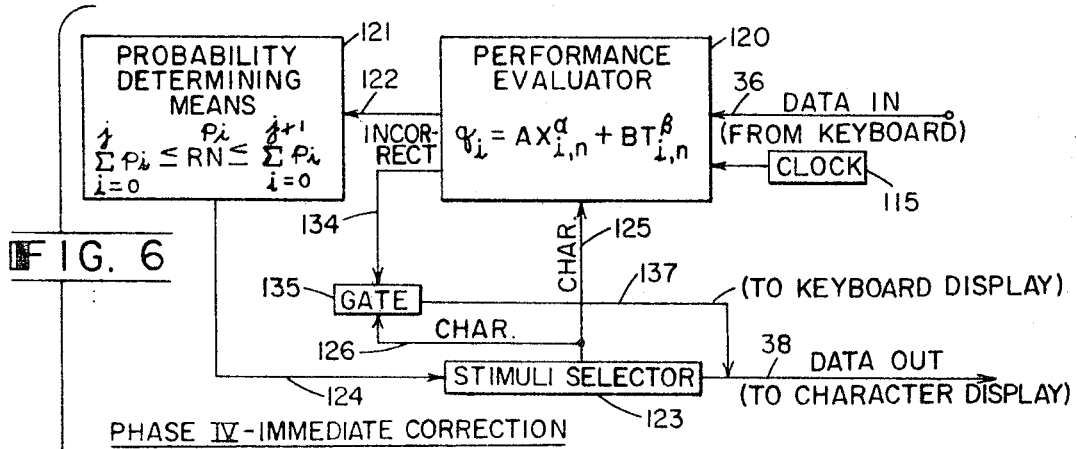
FIG. 6 PHASE IV - IMMEDIATE CORRECTION
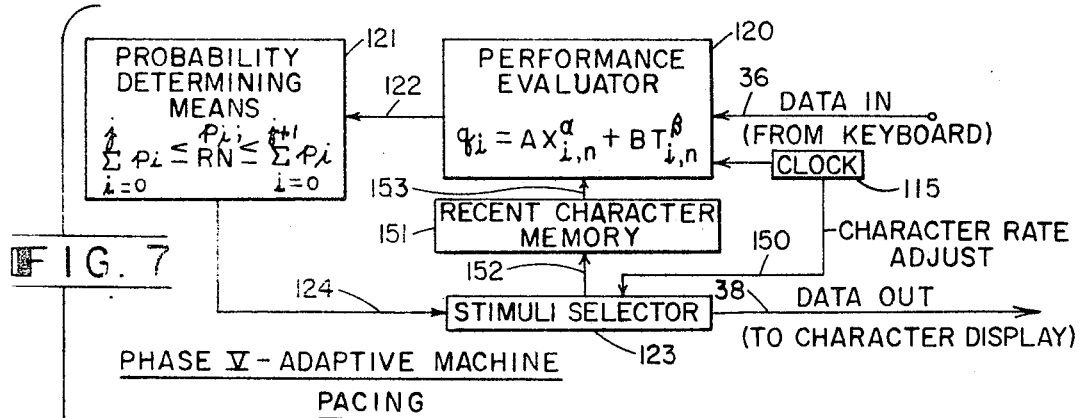
FIG. 7 PHASE V - ADAPTIVE MACHINE PACING

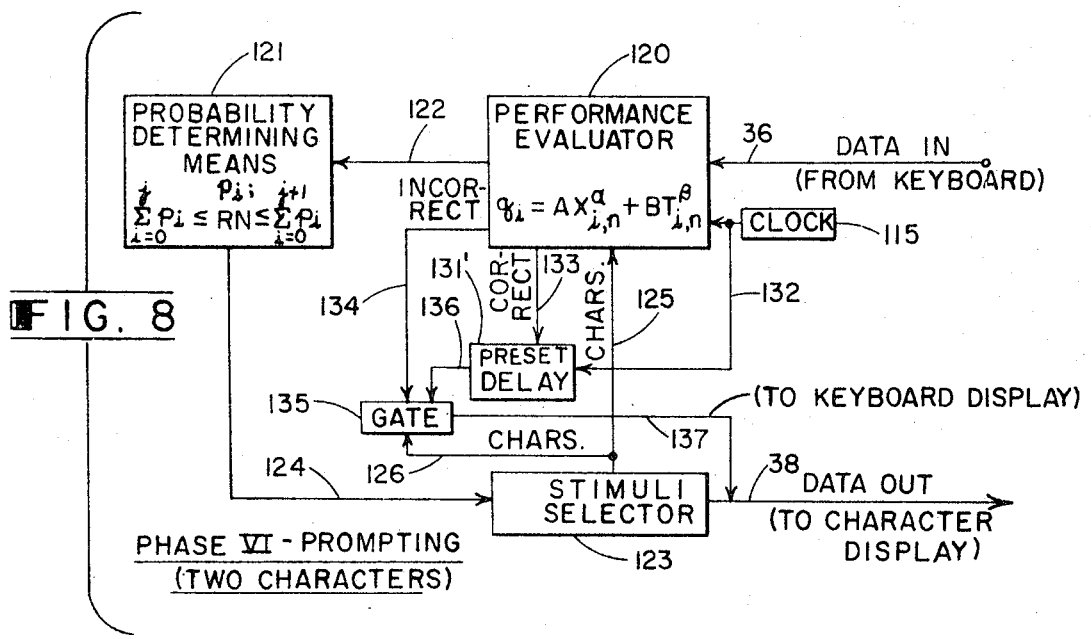
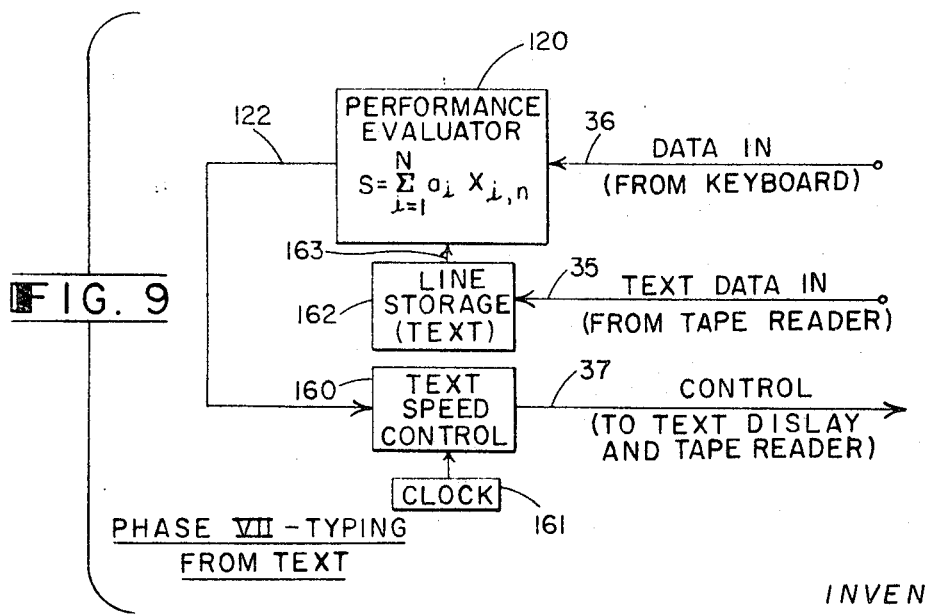

3,460,270
Patented Aug. 12, 1969

3,460,270
ADAPTIVE TRAINING SYSTEMS AND
APPARATUS
Melvin H. Blitz, Framingham, and Donald W. Brown,
Scituate, Mass., and Guy Black, Washington, D.C.,
assignors to Sylvania Electric Products Inc., a corporation of Delaware
Filed Dec. 23, 1966, Ser. No. 604,360
Int. Cl. G09b 13/02
U.S. Cl. 35—6                10 Claims

ABSTRACT OF THE DISCLOSURE

An adaptive educational typing training system for training one or more subjects. A plurality of typing characters, each having a predetermined statistical probability of occurrence, are successively presented in accordance with the predetermined statistical probabilities of occurrence to a subject at a training station. Typing responses to the characters are entered by the subject and evaluated as to the correctness or incorrectness and as to response times. Based on the overall performance of the subject to each character, the statistical probability of occurrence of the character is modified. More particularly, if the subject enters an incorrect response to a character or an untimely response, whether correct or not, the statistical probability of occurrence of the character is increased. If the subject enters a correct and timely response to the character, the statistical probability of occurrence of the character is decreased. The characters are repetitively presented to the subject and the statistical probabilities of occurrence are continually updated in accordance with the various responses to the characters. Multiple characters, words, and text material may also be presented to the subject once he has mastered single characters.

---

This invention relates to educational training systems and apparatus, and more particularly, to real-time training systems and apparatus for the adaptive teaching of motor skills.

In recent years the need for training systems and apparatus of an electrical or electromechanical nature for teaching one or more students has been demonstrated. Such need has stemmed both from the increasing number of students in the fields of education, business, industry, and government, and the accompanying shortage of training personnel.

The problems created by an enlarging student population have been serious. Because of increasing numbers of students, teachers have not been able to devote sufficient time or attention to the specific needs of the individual student or to his particular-rate of progress. A level of training suitable only to the bulk of students has been the principal result. Attempts to solve the problem of teaching large numbers of students by placing students in one of several categories, such as above average, average, and below average, based on the results of competitive or intelligence quotient tests, and training them accordingly, have not been entirely successful.

Many investigations and studies have been conducted and much statistical data accumulated concerning the basic learning process. As a result of such effort it has been ascertained that the learning process takes into account a large number of factors of a highly individual nature. These factors include the capacity of an individual to learn and his rate of learning, both of which are regulated primarily by the age and intelligence of the individual; and the psychological, physiological, emotional, and motivational make-up of the individual.

Moreover, classical studies have clearly indicated that the rate of reception and assimilation of mental concepts by an individual are controlled by several interdependent principles of learning. Generally, these studies have indicated that the acquisition and assimilation of a given subject matter is theoretically optimized where training systems include as integral parts thereof: active participation; self-pacing and immediate reinforcement; elimination of learned material and introduction of new material based on student response; repetition of material; presentation of meaningful material; and rest periods.

Various training techniques and prior art systems and machines purporting to solve the above-mentioned problems and to satisfy the above-mentioned principles of learning have appeared heretofore from time to time but each one has been found wanting in some respects. Certain of the prior art teaching machines and systems, characterized by the sequential and uninterrupted presentation of subject matter, have not allowed the student to pace himself or afforded the instructor sufficient time to devote to satisfying individual, specific needs, or to monitoring significantly the responses and the rate of progress of the individual. Additionally, typical measures of a student's progress, e.g., written or motive tests, given subsequent to training by teaching machines and systems of the aforementioned type, have resulted in a lack of sufficient and immediate reinforcement of the individual's responses, occasioned by the long and frustrating delays between the actual executed responses and a presentation to him of an evaluation of his answers.

Other prior art educational machines and systems, of an "adaptive" nature, have attempted to give "extra instruction" in those areas where the student has experienced the most learning difficulty, based on such factors as incorrect responses and response times of the student. Generally, the extra instruction has been provided by way of explanation to the student of the specific nature of his errors, as by answer booklets, visual devices such as slides and films, by varying the number of times of presentation of the entire body of subject matter, or by varying the sequence in which distinct portions of the entire body of subject matter are presented. An example of a system employing the latter type of extra instruction is described in U.S. Patent No. 3,121,959 to Uttal.

Because the latter mentioned educational machines and systems have been of limited purpose and directed mainly to the "problem solving" area, they have been relatively impractical for teaching such skills as typing, Morse code reception, key-punch operation, or spelling, where a minimum of elicitation of provocative logical thought and a great deal of rote memorization and repetitive responses to individual characters or stimuli are required to achieve the desired learning situation. And, while some of the latter mentioned prior art machines and systems are of an "adaptive" nature in that extra instruction is provided to the student on the basis of past performance, none has been known to present stimuli to the student at a statistical frequency of occurrence or probability based on the past performance of the student.

It is an object of the invention, therefore, to provide an improved educational training system and apparatus for adaptively teaching basic skills.

It is another object of the invention to provide an adaptive educational training system and apparatus employing the basic principles of learning in which the frequency or probability of presentation to a student of individual response-evoking stimuli is a function of the correctness of the individual responses of the student to the stimuli, duration of response times, or both.

It is a further object of the invention to provide a flexible, self-pacing educational training system and apparatus for adaptively training any number of students at any stage of training of a training program essentially simultaneously, and for monitoring the responses and rate of progress of any student.

Briefly, in accordance with the foregoing objects of the invention, a stimuli selecting means is provided for selecting and transmitting individual stimuli, representing discrete elements of the subject matter to be taught, to a student. Initially, the discrete elements are selected for presentation to the student in accordance with a predetermined statistical frequency of occurrence, or probability density function. The probability density function may be uniform at the outset of training or weighted in any desired fashion. As will be more apparent hereinafter, the stimuli may be presented in a single set or in a plurality of sequential sub-sets.

The stimuli from the stimuli selecting means are received and presented individually for response thereto on a stimuli receiving means. Upon sensing each stimulus, the student subject executes a motor response by operating a responses transmitting means. The responses, which may or may not be correct responses to the stimuli, or may or may not be properly executed within a preselected period of time, are transmitted by the responses transmitting means to a performance evaluating means.

The performance evaluation means is adapted to evaluate each of the responses as to correctness, duration of response times, or both, and to provide a measure of the evaluated performance. If desired, relative weights may be placed upon any or all of early performance, recent performance, correctness performance and response times performance. In response to the measure of performance, a probability determining means is rendered operative to determine a new probability for each stimulus which elicited a response, whether the response was correct, incorrect, timely, or late. The "next character" to be presented after each response, based on its rank in a probability priority scale, is also determined by the probability determining means and selected for presentation to the student subject by the stimuli selecting means. The cycle of events is then repeated. As will be described herein, the system is operative such that a new stimulus is not presented to the student subject until a proper response has been received for the prior stimulus, thereby providing a correctional method of discrimination resulting in a lower number of reversals. In this manner, the rate of progress of the student is continuously controlled.

The invention further contemplates a system and apparatus for adaptively teaching touch typing to several subjects essentially simultaneously. By using the system and apparatus of the invention, it is possible for several students to be trained at different levels of a training program essentially simultaneously and for each student to progress at his own rate. In implementing the above-mentioned multi-student training system, means are provided for addressing each student location and for presenting appropriate typing characters (stimuli) based on the initial predetermined probability density function of the characters. The responses to the characters as to correctness, as to duration of response times, or as to both correctness and duration of response times, are evaluated and new probabilities determined. As before, a new character stimulus is not presented to a student subject until he has made a proper response to the prior character stimulus.

For purposes of understanding the invention, description thereof will be made in connection with several exemplary computer-programmed stages or phases of training for teaching students the basic motor skills of touch typing. As will be apparent, satisfactory progress from one phase to a subsequent and more advanced phase, until all phases have been completed, results in the acquisition of basic typing skills and the satisfaction of the previously mentioned basic learning principles or criteria.

The details of the invention and the manner in which the objects and advantages of the invention may best be achieved will be understood more fully from a consideration of the following description taken in conjunction with the accompanying drawings in which like reference numerals are used throughout and in which:

FIG. 1 is a simplified functional block diagram of a basic adaptive educational training system employing the concept of the invention;

FIG. 2 is a block diagram of a computer-controlled adaptive educational training system for the training of touch typing;

FIG. 3 is a functional block diagram of the programmed arrangement of computer apparatus of the invention during a first phase of an exemplary touch typing training program; and FIGS. 4 through 9 are functional block diagrams of the programmed arrangement of the computer apparatus during subsequent phases of the exemplary touch typing training program.

Basic adaptive training system

Referring to FIG. 1, a functional block diagram of a basic adaptive educational training system of the invention is shown. A general-purpose computer 1 is adapted to communicate with a single student station 2 by means of a pair of suitable transmission links 11 and 16. A stimuli selector 10 selects individual stimuli of an aural, visual, electrical, etc., nature for transmission over the transmission link 11 to a stimuli receiver 13 at the student station 2. As previously mentioned, each stimulus is assigned a predetermined initial frequency of occurrence or probability. The stimulus transmitted to the stimuli receiver 13 by the stimuli selector 10, or a signal representative thereof, is also applied to a storage portion of a performance evaluator 14 via a line 12 and stored therein in a conventional manner. The purpose of storing the stimulus is to permit later comparison with the return response so as to determine the correctness of the response.

At the student station 2, the stimuli receiver 13, of any suitable type, e.g., visual or aural, is adapted to receive each stimulus and to present it to a subject for a response. The subject senses each stimulus and responds to it by means of a responses transmitter 15 which communicates the response to the performance evaluator 14 over the communication link 16. The performance evaluator 14, which typically includes clock apparatus, arithmetic and storage registers, and comparison circuitry, is rendered operative to evaluate the individual responses as to correctness, duration of response times, or both, as will be appreciated more fully from the discussion of FIGS. 3 through 9. As mentioned previously, relative weights may be placed upon any or all of early performance, recent performance, correctness performance, and response times performance. An output signal, indicative of the performance of the subject for each stimulus, is provided on a line 17 by the performance evaluator 14 to a probability determining means 18. An INCORRECT-INHIBIT line 19 is provided for inhibiting the stimuli selector 10 from issuing a new stimulus in the event incorrect responses to stimuli are received by the performance evaluator 14.

The probability determining means 18 responds to the output signal of the performance evaluator 14 for each evaluated response to provide an output signal on a line 20 representative of a new probability for each stimulus which elicited a response, that is, a correct, incorrect, timely, or late response. For example, the probability determining means 18 is operative such that a correct and timely response to a particular stimulus results in a decrease in the probability of the particular stimulus. For a correct but untimely response, the probability of the stimulus is increased. Similarly, for an incorrect but timely response or an incorrect and untimely response, the probability of the particular stimulus is increased.

Thus, it is clear that each stimulus at a given instant has a particular, although variable, probability. Furthermore, at any given instant, the probability for a particular stimulus is a function of a student's history of errors and response times on the particular stimulus. As will also become more apparent from the description of FIGS. 3 through 9, the next stimulus is selected by the stimuli selector 10 for presentation to the stimuli receiver 13 as determined by the probability determining means 18.

As mentioned previously, the stimuli comprising the subject matter to be taught may be presented in the form of a single set or a plurality of sub-sets. In the case of a single set, each stimulus to be presented may initially have an equal probability of occurrence, that is, the set has a uniform probability density function. The probability of each stimulus is subsequently altered in accordance with performance, as discussed hereinabove. In the case of a plurality of sub-sets, the stimuli of a first sub-set only are initially presented to a subject. The sub-set is characterized by a uniform probability density function. As the subject "learns" the first sub-set to a certain level of proficiency, a second sub-set is added to the first sub-set for presentation to the subject.

The stimuli of the second sub-set are then selected in accordance with a uniform probability density function while the elements of the first sub-set are selected in accordance with an updated density function which reflects the past performance of the student. The process is repeated by adding another sub-set to the element selection bank as the student achieves a certain level of proficiency on the elements of each added sub-set. When performance measures of all elements of the last sub-set have been determined, all elements of the set are hereafter selected by the statistical selecting means 10 with a statistical incidence controlled by the student's performance, thereby effecting a truly adaptive training system.

Adaptive typing training system

FIG. 2 illustrates in block diagram form a computer-controlled adaptive typing training system for training several students at different possible stages of a training program essentially simultaneously. As indicated by FIG. 2, a general-purpose central computer 30 communicates with a plurality of student stations 31, only one of which is shown in FIG. 2, a command decoder 32, and an instructor station 33. The communication lines for interconnecting the above-mentioned apparatus include: an ADDRESS SELECTION line 34 for transferring binary-coded station addresses from a conventional address register 21 to the student stations 31 and to the instructor station 33; a TEXT DATA IN line 35 for receiving text subject matter from the student stations 31; a DATA IN line 36 for receiving binary-coded response data from the student stations 31; a CONTROL line 37 for transferring binary-coded control signals to the command decoder 32 for the control of the operation of various apparatus located at the student stations; and a DATA OUT line 38 which transfers binary-coded stimuli, i.e., characters, from the computer 30 to the student stations 31 and to the instructor sation 33.

The receiving apparatus of the student station 31 shown in FIG. 2 includes a station address decoder 40 connected to the ADDRESS SELECTION line 34 by a line 41 for decoding a particular binary station address applied thereto. An input character register 42 is connected to the DATA OUT line 38 via a line 43 for temporarily storing a binary-coded input character. A plurality of steering gates 44, connected to the command decoder 32 by a CHARACTER DISPLAY line 49 and a KEYBOARD DISPLAY line 50, are provided for gating the binary coded input character stored in the input character register 42 over a line 45 to one of a pair of gate output lines 46 and 47 upon receipt of a decoded signal from the command decoder 32 (over the line 49 on the line 50) and a decoded signal from the station address decoder 40. A plurality of drivers 51 connected to the gate output line 46 receive the binary-coded character stored in the input character register 42 over the gate output line 46 and drive an alphanumeric character display 52 coupled thereto by a line 53. A decoder 54 coupled to the gate output line 47 decodes the binary-coded character received from the input character register 42 over the line 47 and applies a signal to one of a plurality of drivers 55 via one of a plurality of lines 56. A keyboard display 57, coupled to the drivers 55 by a plurality of lines 58, and including an array of indicators arranged in a keyboard pattern and color coded to correspond to the fingers to be used on a keyboard 70, is rendered operative by signals on the line 58.

The data receiving apparatus of the student station 31 of FIG. 2 further includes a text display 59 of the fixed page, moving window, or the moving page, fixed window type for presenting line and page text material during an advanced stage of training to be described hereinafter. The text material may be advanced by line or by page by means of a decoded control signal applied by the command decoder 32 to the LINE ADVANCE and PAGE ADVANCE lines 60 and 61, respectively, and to a text control 62 coupled to a driver 63 by a text control output line 64. The driver 63 is coupled to the text display 59 by means of a driver output line 65 over which driver output signals are applied to operate the text display. Although not shown, audio apparatus, under appropriate control of the command decoder 32, may also be used in the FIGURE 2 adaptive training system to present the student with audio signals in addition to the visual signals displayed by the alphanumeric character display 52 and the keyboard display 57. Additionally, if desired, a tachistoscope, under control of the command decoder 32, may also be used.

The data transmitting apparatus of the single student station 31 shown in FIG. 2 includes a keyboard 70 for providing binary-coded response signals on a keyboard output line 71 upon the depression of a key or keys by a student. An output character register 72 temporarily stores the coded responses from the keyboard 70. A gate 73, connected to the DATA IN line 36 by a CHARACTER OUT line 74, is provided for gating the stored contents of the output character register 72 over a character register output line 75 to the CHARACTER OUT line 74 upon receipt of a decoded control signal from the command decoder 32 on a KEYBOARD READOUT line 76. The data transmitting apparatus further includes a mechanical paper tape reader 80 connected to a tape control 82 by means of bi-directional tape control lines 81. A gate 83, connected to the tape control 82 by a pair of bi-directional control lines 86, gate a few lines at a time of text material from the paper tape reader 80 onto a TEXT CHARACTERS OUT line 84 upon receipt of a decoded control signal from the command decoder 32 on a TAPE READOUT line 85.

The instructor station 33 of FIG. 2 is employed for monitoring purposes. More specifically, an instructor, by selecting an appropriate station selector switch, is able to observe at his console, the characters that are presented to any particular station and the responses made thereat.

The instructor station 32 is provided with a decoder 88 coupled to the ADDRESS SELECTION line 34 for receiving binary address codes of all student stations and for providing individual decoded signals on a plurality of decoder output lines 90. To select a particular student station to be monitored, a selector switch 91 is moved to an appropriate position corresponding to the particular student station to select one of the decoder output lines 90. A steering gate 92 is coupled to the selector switch 91 by an output line 93, to a decoder 97 by a gate output line 98, and to a character register 94 by means of a register output line 96. The gate 92 is rendered operative to gate an input character, received by the input character register 94 from the DATA OUT line 38, over the register output line 96 to the gate output line 98 and to the decoder 97. The decoder 97 selectively energizes a selected one of a plurality of drivers 99 over a corresponding one of a plurality of decoder output lines 100. A character indicator, corresponding to the selected student station, is illuminated on a character indicator display 101 by a signal on a selected one of the driver output lines 102.

Responses of a particular student are also monitored at the instructor station 33. As shown in FIG. 2, the responses are received from the keyboard 70 over the DATA IN line 36 by a response register 103. The responses are applied to a response register output line 105, and gated by a steering gate 106 over a line 104 to a decoder 107, upon receipt of a signal on the output line 93. The decoder 107 provides an output signal on a selected one of a plurality of decoder output lines 108 to a corresponding one of a plurality of drivers 109. A response indicator, having a color differing from that of the character indicators, is illuminated on a response indicator display 110 by a driver output signal on a selected one of a plurality of driver output lines 111.

Operation of adaptive typing training system

The operation of the adaptive training system of FIG. 2 may best be understood by describing the manner by which selection of a student station is accomplished, how character stimuli are presented to the student at the selected station, and how responses to the character stimuli are executed. It will be assumed for the purposes of discussion that the first student station only, as shown in FIG. 2, is to be selected.

The first student station 31, FIG. 2, is selected in a known manner by an address register 21 which generates a coded address assigned to the first student station only. As shown, the address register 21 may comprise a part of the computer 30. The coded address is applied to the ADDRESS SELECTION line 34, to the line 41, and then to the station address decoder 40. The specific code applied to the station address decoder 40 is also applied over a line 26 to the station address decoders of the remaining student stations 31. However, since the remaining stations address decoders are assigned different codes, they cannot respond to the first station code and, hence, no apparatus at those stations is operated.

Concurrent with the selection of the first student station, a binary-coded character is transferred by the DATA OUT line 38 and the line 43 to the input character register 42 and stored therein. A binary-coded control signal for effecting operation of the alphanumeric character display 52, the keyboard display 57, or the text display 59 (advanced stage of training), is also generated in a known manner by the CONTROL REGISTER 22 which, as shown, may also form part of the computer 30. The coded control signal is transferred to the command decoder 32 via the CONTROL line 37 and decoded thereby. For operation of the character display 52, a decoded control signal is applied to the CHARACTER DISPLAY line 49. The decoded control signal on the CHARACTER DISPLAY line 49, together with the decoded station signal on the station address decoder output line 48, cause the steering gates 44 to gate the coded character stored in the input character register 42 onto the gate output line 46 to the drivers 51. The appropriate alpha-numeric characteris illuminated by the alpha-numeric character display 52.

For operation of the keyboard display 57, a decoded control signal is applied by the command decoder 32 to the KEYBOARD DISPLAY line 50. The decoded control signal on the KEYBOARD DISPLAY line 50, together with the decoded station signal on the station address decoder output line 48, cause the steering gates 44 to gate the coded character stored in the input character register 42 onto the gate output line 47 and to the decoder 54 and the drivers 55. The appropriate indicator is illuminated by the keyboard display 57. For operation of the text display 59, a decoded control signal appears on the LINE ADVANCE line 60 or the PAGE ADVANCE line 61, depending on whether a line or page advance is called for.

In responding to a single character displayed on the alphanumeric character display 52 or to an indicator illuminated on the keyboard display 57, the student merely depresses the correct key on the keyboard 70 corresponding to the displayed character or illuminated indicator. In so doing, a binary-coded response is applied by the line 71 to the output character register 72 and stored therein. If desired, the response character may be typed simultaneously on hard copy at the keyboard area. Upon receipt of an appropriately-timed decoded control signal from the command decoder 32 on the KEYBOARD READOUT line 76, the stored binary-coded contents of the output character register 72 are gated over the CHARACTER OUT line 74 to the DATA IN line 36 and into the central computer 30. As mentioned previously, and as will become more apparent from the discussion of FIGURES 3 through 7, particularly, the central computer 30 evaluates the performance of the student for the individual response as to correctness, response time or, alternatively, both as to correctness and response time, and determines the new probability for the character eliciting the response. An other character is then presented to the student to elicit the next response.

Responses by the student to the text material appearing on the text display 59 is also made at the keyboard 70. The student merely depresses the appropriate keys of the keyboard 70 corresponding to the text material presented. The coded characters are gated onto the CHARACTER OUT line 74 onto the DATA IN line 36 to be analyzed by the comptuer 30. At the same time, a few lines of text material from the paper tape reader 80, corresponding to lines of text appearing on the text display 59, are gated via the TEXT CHARACTERS OUT line 84 and the TEXT DATA IN line 35 to the computer 30, under appropriate control of a decoded control signal on the TAPE READOUT line 85.

As mentioned previously, each individual character presented to the student at the first student station 31, and each response thereto, may be monitored at the instructor station 33. The binary-coded address of the monitored student station is transferred to the instructor station 33 by the ADDRESS SELECTION line 34. The binary-coded characters are transferred to the instructor station 33 by the DATA OUT line 38. The binary-coded responses are transferred by the DATA IN line 36. Each of the abovementioned coded signals is decoded, and both the characters and the responses are indicated on the character indicator display 101 and the response indicator display 110, respectively Although the selection and operation of only a single student station has been described, it should be obvious that the remaining student stations are selected and operated in a similar manner. The student stations may be code selected in sequence at a sufficiently great speed such that no response from any keyboard at any student station is detected in untimely fashion. Alternatively, common interrupt apparatus may be provided whereby a student station interrupts the computer whenever service is desired. The particular code bit lengths necessary for station selection, control, and response are determined by the number of student stations to be serviced and the number of control operations to be executed at each station. Thus, for an exemplary 24 student station arrangement, six control functions, and approximately 45 characters and 45 responses, a 5-bit address code, a 3-bit control code, a 6-bit character code, and a 6-bit response code have been found to be sufficient.

In employing the system of FIG. 2 for teaching touch-typing, the various training schedules for each student are stored by the instructor or programmer in a known fashion in the central computer 30. The schedules, which include the phase of training, suitable response time, character sets, and speed (advanced phase of training) for each student, are stored in the computer 30 by means of an input-output typewriter 27. During rest breaks, a performance report for each student, including the number of trials for each character, number of errors, response times, phase of training, etc., is prepared by the computer and the results printed out on an off-line Flexowriter 31 for further analysis. The performance reports also serve to indicate to the instructor the progress of each student and what corrective measures or changes in the training program may be required.

The manner in which the training system of FIG. 2 may be employed in a typical typing training program may best be understood from a description of an exemplary training program, containing seven computer-programmed steps of phases, and the manner in which the computer evaluates each coded response of a student, determines new probabilities for all characters displayed, and presents new characters to student station display apparatus for the seven phase program. It will be assumed that both correctness of responses and response times are to be evaluated although, as previously stated, only correctness of responses, or duration of response times may be evaluated if so desired. The training phases to be described in conjunction with FIGS. 3 through 9 may be briefly designated as follows:

Phase I (FIG. 3)—Pre-Training
Phase II (FIG. 4)—Prompting (single character)
Phase III (FIG. 5)—Reinforcement (single character)
Phase IV (FIG. 6—Immediate Correction (single character)
Phase V (FIG. 7)—Adaptive Machine Pacing (single character)
Phase VI (FIG. 8)—Prompting (two characters)
Phase VII (FIG. 9)—Typing from Text.

Phase I (FIG. 3)—Pre-training

The purpose of the Pre-training Phase (Phase I) is to train the motor responses required of the student typist, i.e., the actuation of correct typewriter keys corresponding to the characters illuminated on a keyboard display such as shown at 57 in FIG. 2.

The programmed arrangement of computer apparatus for the Pre-training Phase is shown in FIG. 3. As shown, the arrangement of apparatus for this initial phase includes: a performance evaluator 120 for receiving each response of a student on the keyboard 70, applied to the DATA IN line 36, FIG. 2; a clock 115 for providing a number of clock pulses to a register indicating the student's response time to each character; a probability determining means 121, coupled to the performance evaluator 120 by means of a line 122, for determining new probabilities and "next character" selection; and, a stimuli selector 123, coupled to the probability determining means 120 by a line 124, to the performance evaluator 120 via the line 125', to the DATA OUT line 38, and to the memory section of the performance evaluator 120 by a line 125. Although not indicated by FIG. 3, sufficient memory and register capacity is provided to accommodate any desired number of students.

The sequence of activities for the Pre-training Phase may be summarized as follows, reference being made to FIGS. 2 and 3:

(1) Upon selection of the first student station 31 and application of an appropriate control code, a selected character is applied by the stimuli selector 123 to the DATA OUT line 38 and to an indicator on the keyboard display 57 of the first student station. The character is also applied to the high-capacity memory section of the performance evaluator 120 by means of the line 125, and stored therein.

(2) The student responds by striking a key on the keyboard 70.

(3) The response to the lighted indicator corresponding to the selected character is received by the performance evaluator 120 from the DATA IN line 36. A register portion of the performance evaluator 120 indicates the elapsed time between the lighting of the indicator and the response thereto. The response is compared with the character previously stored in the memory of the performance evaluator 120 to determine its correctness.

(a) If the response is correct, the indicator on the keyboard display 57 is extinguished by the computer.

(b) If the response is incorrect, a signal on the line 125' inhibits the generation of a new stimulus by the stimuli selector 123 and the indicator remains on until the correct response is made.

(4) A signal representing the combined measure of performance is applied by the performance evaluator 120 to the probability determining means 121. The new probability of the character presented to the student is determined and stored in the memory section of the probability determining means 121. The next character for presentation by the keyboard display 57 is also determined by the probability determining means 121.

(5) The next character as determined under (4) is presented by the stimuli selector 123 to an indicator of the keyboard display 57 for response by the student.

The above-described cycle of events is repeated for a sufficient number of times until the student has acquired the motor skills required to proceed to the next phase of training. That is, he is able accurately to match the keys of the keyboard 70 with the lighted indicators on the keyboard display 57. With the evaluation of each subsequent response, the probability of each character is updated, stored in the memory of the probability determining means 121, and a new character selected based on the updated probability of each character.

Performance evaluation, determination of probabilities, and "next character" selection Before proceeding further, the specific manner in which the performance of a student is evaluated by the apparatus required in Phase I and in subsequent phases will be now described in some detail.

The measure of correctness performance $X_{i,n}$ for an $i$th character may be defined in a known manner by the equation $$X_{i,n} = \lambda X_i + (1-\lambda) X_{i,n-1} \qquad 0 \leq \lambda \leq 1 \qquad (1)$$

$X_i = 0$ for incorrect response; $X_i = 1$ for correct response and the measure of response time performance $T_{i,n}$ by the equation $$T_{i,o} = \mu T_i + (1-\mu) T_{i,n-1} \qquad 0 \leq \mu \leq 1 \qquad (2)$$

where $X_{i,n-1}$ is the value of the measure of correctness performance for the immediately prior presentation of the $i$th character; $X_i$ is the correctness response for the $i$th character; $T_{i,n-1}$ is the value of the measure of response time for the immediately prior presentation of the $i$th character; $T_i$ is the time response for the $i$th character; and $\mu$ and $\lambda$ are preset constants which determine the relative weights or importance to be placed upon the earlier performance as opposed to more recent performance.

Upon solution of the above equations, the combined measure performance may readily be determined by solving the following equation for an overall measure of performance, $q_i$, $$q_i = A X_{i,n}^{\alpha} + B T_{i,n}^{\beta} \qquad (3)$$

where A, B, $\alpha$ and $\beta$ are preset constants which determine the relative weights or importance to be attached to correctness performance and time response performance.

To determine the new possibility $p_i$ for the $i$th character, the equation $$p_i = \frac{q_i}{\sum_{i=1}^{N} q_i} \quad (4)$$

is solved, wherein N relates to the number of characters. To select the next character, a random number RN is chosen from a uniform distribution $0 \leq RN \leq 1$. The next character, the $j$th character, is accordingly selected by satisfying the "next character" selection probability density function:

$$\sum_{i=0}^{j} p_i \leq RN \leq \sum_{i=0}^{j+1} p_i \quad (5)$$

From the above discussion, it should now be obvious that in FIG. 3, the performance of a student is evaluated by the performance evaluator 120 by solving for $X_{i,n}$, $T_{i,n}$, and $q_i$ (Equations 1 through 3). The solutions of these expressions are accomplished in a known manner by arithmetic sections of the performance evaluator 120. It will further be obvious that the new probability of a character is determined by solving for $p_i$ (Equations 4) and that the "next character" for transmission to a student is determined by satisfying the selection probability density function (Equation 5). The solutions of $p_i$ and the selection probability density function are accomplished by means of arithmetic sections of the probability determining means 121.

Phase II (FIG. 4)—Prompting (single character)

The purpose of the second phase of training, the Prompting Phase, is to connect the motor response learned in the Pre-training Phase (Phase I) to the characters that they represent. This connection is accomplished by presenting the characters individually on the alphanumeric character display 52, FIG. 2, located above the keyboard 70, and after a preset interval (for example, between 0 and 2 seconds), lighting the display indicator on the keyboard display 57 corresponding to the correct key. In this phase, the student attempts to "beat" the indicator on the keyboard display 57. As may be noted, the Prompting Phase is illustrative of the classical conditioning situation in which a "to be conditioned stimulus", i.e., the individual character on the character display 52, is paired with an already established stimulus-response pair, (i.e., the keyboard indicator-typing pair (until the former stimulus comes to evoke the response.

The apparatus for this phase includes: the performance evaluator 120, the probability determining means 121, the clock 115, and the stimuli selector 123; a preset delay 131 coupled to the clock 115 by means of a line 131; a CORRECT signal line 133 and an INCORRECT signal line 134; and a gate 135 for receiving an input signal over a line 136 from the preset delay 131, an input signal from the INCORRECT line 134, and a character input from the line 126, and for providing an output signal on a line 137 to the DATA OUT line 38.

The sequence of operations for the Phase II apparatus may be summarized as follows:

(1) Upon selection of a student station, a selected character is applied to the DATA OUT line 38 to the single alphanumeric character display 52. The character is also applied to the memory section of the performance evaluator 120 by means of the line 125 and stored therein.

(2) The student responds by striking a key on the keyboard 70.

(3) The response to the single displayed character is received by the performance evaluator 120 over the DATA IN line 36. The correctness and response time performance are evaluated as in Phase I by the performance evaluator 120 (Equations 1, 2, and 3).

(a) If the student responds correctly in less than the pre-set interval, for example, 2 seconds, the preset delay 131, indicating the response time established by the running of the clock 115, is reset by a signal on the CORRECT line 133, and the next character, as determined by the probability determining means 121 (Equations 4 and 5), is applied by the stimuli selector 123 over the DATA OUT line 38 to the character display 52. As in Phase I, the new probability is also stored in the probability determining means 121.

(b) If the student responds incorrectly during the preset interval, a signal is applied to the INCORRECT line 134 by the performance evaluator 120 and the previously presented character, appearing on the line 126, is gated by the gate 135 to the line 137, to the DATA OUT line 38, and to the keyboard display 57, FIG. 2. The appropriate indicator on the keyboard display 57 is illuminated accordingly and remains illuminated until a correct response is made. The new probability for the character is determined by the probability determining means 121 (Equations 4 and 5).

(c) If the student does not respond within the specific interval, the keyboard indicator corresponding to the character is lighted in the manner of (b), supra, indicating to the student which key he should operate. As soon as the student has made the correct response, the next character, as determined by the probability determining means 121, is presented (Equations 4 and 5).

(4) The above-described cycle is repeated for a sufficient number of times until the student is able to match the individually-displayed characters with the corresponding keys on the keyboard 70.

Phase III (FIG. 5)—Reinforcement (single character)

The purpose of Phase III, the Reinforcement Phase, is two-fold. First, it is believed that the Reinforcement Phase strengthens the individual character-typing connections (stimulus-response) established in Phase II; secondly, the Reinforcement Phase is believed to serve as an effective remedial device. The programmed arrangement of computer apparatus for the Reinforcement Phase is shown in FIG. 5. The arrangement is essentially the same as that shown in FIG. 4 with a principal exception being that a one-shot blinker 140 is employed to "blink" momentarily a keyboard indicator, corresponding to a character, for each correct response. The one-shot blinker 140 is coupled to the gate 135 by a line 141.

The sequence of operations in this phase is the same as in Phase II, FIG. 4, with the following exception. If the student responds correctly and satisfactorily to a character displayed on the alphanumeric character display 52, FIG. 2, the performance evaluator 120 provides a signal on the CORRECT line 133 to the one-shot blinker 140, and the previously-presented character, appearing on the line 126, is gated by the gate 135 onto the line 137, the DATA OUT line 38, and to the keyboard display 57. The appropriate indicator on the keyboard display 57 is illuminated. If the indicator remains on for any appreciable period of time, for example, more than one-half second, the duration of operation of the one-shot blinker 140, the student knows that he has made an erroneous response. As in Phase II, indication of a wrong response is provided by a signal on the line 137 from the gate 135. Thus, the student is forced to respond correctly before a new character is presented. Each response is evaluated (Equations 1, 2, and 3) and probabilities and "next character" selection are determined, as before, by the probability determining means 121 (Equations 4 and 5).

Phase IV (FIG. 6)—Immediate correction (single character)

In the next phase of training, the Immediate Correction Phase, the student receives continuous reinforcement whereby he is encouraged to build his speed to the maximum rate of which he is capable while requiring him at the same time to correct errors. Unlike the previous phase, Phase III, an indicator on the keyboard 57 is lighted only when an incorrect response is made. The programmed arrangement of computer apparatus, shown in FIG. 6, is the same as that of FIG. 4, Phase II, with the exception that the preset delay 131 of FIG. 4 has been omitted in FIG. 6.

In the operation of the apparatus of FIG. 6 to provide immediate indications of incorrect responses, a signal on the INCORRECT line 134 is applied to the gate 135 whereby the previous character, appearing on the line 126, is gated onto the line 137, to the DATA OUT line 138 and to the appropriate indicator on the keyboard display 57. As in the previous phases, each response is evaluated by the performance evaluator 120 (Equations 1, 2, and 3), and new probabilities are determined and stored and "next characters" determined and presented to the character display 52 in accordance with the previously described computations (Equations 4 and 5). And, as in previous phases, the student is caused to undergo several cycles of training in this phase until errors are minimized.

Phase V (FIG. 7)—Adaptive machine pacing (single character)

While the prior phases of training are of a self-pacing nature, that is, the student paces himself, in Phase V, the Adaptive Machine Pacing Phase, the computer 30 forces the student to increase his "single character" typing speed. Specifically, the programmed arrangement of computer apparatus for the Phase V, shown in FIG. 7, takes away the pacing control of the student by adjusting the rate of characters presented to him. As shown in FIG. 7, the clock 115, coupled to the stimuli selector 123 by a CHARACTER RATE ADJUST line 150 and to the performance evaluator 120, determines a fixed rate in which characters are applied to the DATA OUT line 38. A recent character memory 151, coupled to the stimuli selector 123 by a line 152 and to the performance evaluator 120 by a line 153, is provided in this phase to store a selected number of characters presented individually to the student, for example, five. The characters may form words, if desired. The recent character memory 150 is required because, in the rapid presentation of characters on the alphanumeric character display 52, it is possible that the student will make correct individual responses to all the characters of a set of presented characters but not as quickly as they are presented or in the particular order presented. That is, the student may "type behind" the characters displayed.

In operation, the apparatus performs as in the previously-described phases to evaluate the performance of the student (Equations 1, 2, and 3), to determine the new probabilities of the characters, and to determine what characters should next be selected (Equations 4 and 5). The operation of the apparatus differs, however, in that the clock 115 fixes the rate in which the characters are to be presented to the student.

Phase VI (FIG. 8)—Prompting (two characters)

The purpose of Phase VI, the "two character" Prompting Phase, is to present a student with two characters, commonly known as digraphs. As may be noted in FIG. 8, the programmed arrangement of computer apparatus is the same as the arrangement of FIG. 4 relating to the prompting phase for single characters. The only structural difference in the prompting phase for two characters is that the preset delay 131' of FIG. 8 has a greater period of delay than the delay of the preset delay 131 of FIG. 4 to accommodate a response to two characters instead of only one. Since the purpose, arrangement and operation of the apparatus of FIG. 8 is essentially the same as that of FIG. 4, with the noted exception, it is not believed that a detailed discussion of FIG. 8 is necessary.

Phase VII (FIG. 9)—Typing from text

The purpose of Phase VII, the last phase of training, is to introduce text material to the student on a line-by-line basis and to evaluate the student's response correctness performance. FIG. 9 illustrates the programmed arrangement of computer apparatus for the Typing From Text Phase. It may be noted that no probability determining means is required in this phase. The apparatus of FIG. 9 thus comprises: the performance evaluator 120; a text speed control 160 coupled to the CONTROL line 37 and operated by a clock 161; and a text line storage 162 coupled to the performance evaluator 120 by a line 163 and to the TEXT DATA IN line 35.

In operation, the text subject matter is presented to a student on the text display 59, FIG. 2, under control of the text speed control means 160. More specifically, control codes are applied to the CONTROL line 37 by the text speed control 160 and decoded by the command decoder 32, FIG. 2. The text material and the text display 59 is advanced by line or by page by means of control signals applied to the LINE ADVANCE line 60 to the PAGE ADVANCE line 61 to operate the text control 62, the driver 63, and the text display 59. As the student responds to the text subject matter on the keyboard 70, the mechanical paper tape reader 80 supplies lines of text equal in number to the lines of text typed by the student. The tape reader subject matter, in a binary-coded form, is gated onto the gate output line 74, FIG. 2, and to the TEXT DATA IN line 35 by the gate 73 upon receipt of an appropriate signal on the TAPE READOUT line 85.

The tape reader subject matter is stored two lines at a time in the text line storage 162, FIG. 9, and fed into the performance evaluator 120 concurrent with the application of keyboard typing responses on the DATA IN line 36 to the performance evaluator 120. The responses are evaluated, i.e., the error rates of individual characters, expressed by $X_{i,n}$ and a weighted average for all characters, expressed by $$S=\sum_{i=1}^{N}a_iX_{i,n}$$

are determined, taking into account any improper additions or deletions by the student, and the new speed of operation of the text display 59, based on the student's performance, is determined in accordance with signals received by the text speed control means 160 from the performance evaluator 120. The constant $a_1$ represents a preset weight for an $i$th character. As the above-described cycle is repeated many times, it becomes evident that the student acquires a level of proficiency whereby he is able to type text subject matter at a normal speed. It may be noted that no continuous intermediate knowledge of performance, with its inherent reinforcement value, is provided in this phase since the student already has a fair idea of how well he is performing. In this phase, only the speed of the text display is controlled in accordance with the student's performance. Obviously, the greater the motivation and the fewer the mistakes of the student, the greater the speed of typing he is likely to achieve.

Conclusion

Although seven specific phases of training have been described to illustrate the operation of the training system of the invention, as shown in FIGS. 3 through 9, it is to be appreciated that phases may be added to or subtracted from those described as experience may dictate. It is further to be appreciated that, although operation of a single student station has been described, several students at different levels of training may be adaptively paced at substantially the same time without the progress of one student affecting the progress of another. Significantly, the results and progress of each student, whether by observation of his performance or by analysis of his performance report, may be monitored.

The various elements of the system described herein are of a conventional nature. Thus, the specific functions of addressing student locations, supplying control signals, decoding, gating, displaying, storing, and control are performed by known apparatus in accordance with well-known communications and computer technologies. The computer employed for performing mathematical calculations is likewise of a conventional nature and its detailed operation is known to those skilled in the art. In implementing the above-described system, a CDC-3200 general-purpose computer of the Control Data Corporation has been successfully employed for the training of touch typing. However, it is contemplated that any general-purpose computer having sufficient speed and arithmetic and storage capability may be used.

If a small real-time computer of limited arithmetic capability is used, a technique which provides an approximation of the more rigorous mathematical technique described hereinabove may be used. More specifically, two sections of memory, or bins, are assigned to each student. The first section initially contains all the characters that are to be presented to the student. The second section is initially left empty. When the student begins training, a character to be presented is selected at random from the first section. If the student responds incorrectly (correctness, time, or both), the character with which he is having trouble is placed in the second section. Once the second section is partially filled, characters are selected at random from either the first or the second section. When a character is selected from the second section, a random number is examined to determine whether to replace the character in that section.

The above-described system for training touch-typing may be readily modified to perform functions other than those related to typing. For example, by providing a suitable tone generator, tone flip-flops, tone gates, and associated audio, headset, and instructor monitoring equipment, a student may be taught Morse code reception in accordance with the adaptive techniques hereinabove described. Similarly, the broad concept of the system of the invention may be used to teach key punch operation, or spelling, or other motor operations of a similar nature, many of which will be obvious to those skilled in the art.

It will now be apparent that a novel, adaptive educational training system and apparatus has been disclosed in such full, clear, concise, and exact terms as to enable any person skilled in the art to which the system and apparatus pertain to make and use the same. It will also be apparent that various changes and modifications may be made in form and detail by those skilled in the art without departing from the spirit and scope of the invention. Therefore, it is intended that the invention shall not be limited except as by the appended claims.

What is claimed is:

1. An adaptive educational training system for presenting text material to a subject and for evoking responses to the text material, said system comprising:
a training station;
text material presenting means adapted to present the text material to a subject;
control means adapted to apply a control signal to the text material presenting means to control the rate of presentation of the text material to the subject, said control means being operative to cause the text material presenting means to present text material to the subject initially at a predetermined constant rate;
means at the training station for entering responses to the text material presented initially to the subject;
performance evaluating means adapted to evaluate the correctness or incorrectness of the responses to the text material presented initially to the subject and to establish whether the subject has achieved a particular level of proficiency on the text material based on the correctness and incorrectness of the responses;
said control means being responsive to the evaluations by the performance evaluating means and operative to apply a control signal to the text presenting means to cause the text presenting means to present new text material to be responded to by the subject at a rate greater than the initial rate if the subject has achieved the particular level of proficiency, or to apply a control signal to the text presenting means to cause the text presenting means to present new text material to be responded to by the subject at a rate less than the initial rate if the subject has not achieved the particular level of proficiency.

2. An adaptive educational training system in accordance with claim 1 wherein:
said performance evaluating means is adapted to provide a measure of correctness performance for all characters, expressed by $$S = \sum_{i=1}^{N} a_i X_{i,n}$$

where $a_i$ is a preset constant representing a weight attached to an $i$th character, N is the number of characters, and $X_{i,n}$ is the measure of correctness performance for an individual character.

3. An adaptive educational training system in which each of a plurality of various stimuli may be presented many times to a subject for evoking responses to the stimuli, each of the stimuli having a particular statistical probability of occurrence, said system comprising:
storage means for storing the stimuli;
presenting means for presenting the stimuli to a subject;
selecting means for individually selecting the stimuli from the storage means in accordance with the initial statistical probabilities of occurrence of the stimuli and for sequentially transmitting the stimuli to the presenting means;
means for entering responses made by the subject to the stimuli;
performance evaluating means for comparing each response made to a stimulus with the stimulus presented to the subject and for providing a measure of performance representative of the correctness or incorrectness of the response to the stimulus; and
probability determining means responsive to the performance evaluating means providing a measure of performance for each response to a stimulus presented to the subject to modify the statistical probability of occurrence of the stimulus so as to increase the statistical probability of occurrence of the stimulus for an incorrect response and to decrease the statistical probability of occurrence of the stimulus for a correct response, the statistical probability of occurrence of the stimulus being capable of being modified so as to have any one of several possible values.

4. An adaptive educational training system in accordance with claim 3 wherein:
the performance evaluating means is operative to compare each response to a stimulus with the stimulus presented to the subject and to establish the correctness or incorrectness of each response to a stimulus presented to the subject, and to establish whether each response to a stimulus has been made by the subject within a predetermined time duration, said performance evaluating means providing a measure of overall performance for each response of the subject to a stimulus; and
the probability determining means is responsive to the performance evaluating means providing an overall measure of performance for each response made to a stimulus presented to the subject to modify the statistical probability of occurrence of the stimulus so as to increase the statistical probability of occurrence of the stimulus for an incorrect response, or for a response, correct or incorrect, not made within the predetermined time duration, and to decrease the statistical probability of occurrence of the stimulus for a correct response made within the predetermined time duration, the statistical probability of occurrence of the stimulus being capable of being modified so as to have any one of several possible values.

5. An adaptive educational training system in accordance with claim 4 wherein:

the measure of overall performance for a stimulus is expressed by $$q_i = AX_{i,n}^\alpha + BT_{i,n}^\beta$$

where $q_i$ is the measure of overall performance for an $i$th stimulus, $X_{i,n}$ is a measure of correctness performance on the $i$th stimulus, $T_{i,n}$ is a measure of response time performance on the $i$th stimulus, and A, B, $\alpha$ and $\beta$ are preset constants which represent the relative weights attached to correctness performance and time response performance; and the probability determining means is operative to modify the probability of occurrence of the $i$th stimulus by providing a solution to the equation $$p_i = \frac{q_i}{\sum_{i=0}^{N} q_i}$$

and to determine the identity of the $j$th stimulus to be presented to the subject by satisfying the stimulus selection probability density function $$\sum_{i=0}^{j} p_i \leq RN \leq \sum_{i=0}^{j+1} p_i$$

where RN is a uniformly distributed random number.

6. An adaptive educational training system in accordance with claim 3 wherein the stimuli have an initial uniform probability density function.

7. An adaptive educational training system in which each of a plurality of various stimuli may be selectively presented many times to each of a plurality of subjects for evoking responses by the subjects to the stimuli, each of the stimuli having a particular statistical probability of occurrence, said system comprising:

a plurality of subject stations;
address means for selectively addressing the subject stations;
storage means for storing the stimuli;
selecting means for individually selecting the stimuli from the storage means in accordance with the statistical probabilities of occurrence of the stimuli, and for sequentially transmitting the stimuli to the subject stations;
means at each of the subject stations responsive to selection by the address means to present a stimulus selected by the selecting means to a subject at the subject station, said address means operating to select only one subject station at a time whereby each stimulus selected by the selecting means is presented to one subject station at a time;
means at each of the subject stations for entering responses made by the subject at the subject station to the stimuli;
performance evaluating means for comparing the responses of each subject with the stimuli presented to the subject and for providing for each response to a stimulus a measure of performance representative of the correctness or incorrectness of the response; and
probability determining means responsive to the performance evaluating means providing a measure of performance for each response made to a stimulus presented to the subject to modify the statistical probability of occurrence of the stimulus so as to increase the statistical probability of occurrence of the stimulus for an incorrect response and to decrease the statistical probability of occurrence of the stimulus for a correct response, the statistical probability of occurrence of the stimulus being capable of being modified so as to have any one of several possible values.

8. An adaptive educational training system in accordance with claim 7 wherein:

the performance evaluating means is operative to compare the responses of each subject with the stimuli presented to the subject and to establish the correctness or incorrectness of each response, and to establish whether each response to a stimulus has been made by the subject within a predetermined time duration, said performance evaluating means providing an overall measure of performance for each response of each subject; and the probability determining means is responsive to the performance evaluating means providing an overall measure of performance for each response made to a stimulus presented to a subject to modify the statistical probability of occurence of the stimulus so as to increase the statistical probability of occurrence of the stimulus for an incorrect response, or for a response, correct or incorrect, not made within the predetermined time duration, and to decrease the statistical probability of occurrence of the stimulus for a correct response made within the predetermined time duration, the statistical probability of occurrence of the stimulus being capable of being modified so as to have any one of several possible values.

9. An adaptive educational training system in accordance with claim 8 wherein:

the measure of overall performance for a stimulus is expressed by $$q_i = AX_{i,n}^\alpha + BT$$

where $q_i$ is the measure of overall performance for an $i$th stimulus, $X_{i,n}$ is a measure of correctness performance on the $i$th stimulus, $T_{i,n}$ is a measure of response time performance on the $i$th stimulus, and A, B, $\alpha$ and $\beta$ are preset constants which represent the relative weights attached to correctness performance and time response performance; and the probability determining means is operative to modify the probability of occurrence of the $i$th stimulus by providing a solution to the equation $$p_i = \frac{q_i}{\sum_{i=0}^{N} q_i}$$

and to determine the identify of the $j$th stimulus to be presented to a subject by satisfying the stimulus selection probability density function $$\sum_{i=0}^{j} p_i \leq RN \leq \sum_{i=0}^{j+1} p_i$$

where RN is a uniformly distributed random number.

10. An adaptive educational training system in accordance with claim 7 further including means for monitoring the responses to the stimuli presented to each of the plurality of subject stations.

References Cited

UNITED STATES PATENTS

| 2,984,017 | 5/1961 | Pask | 35—8 |
| 3,114,210 | 12/1963 | Uttal | 35—6 |
| 3,136,073 | 6/1964 | Steury | 35—6 |
| 3,141,243 | 7/1964 | Chapman et al. | 35—9 |

EUGENE R. CAPOZIO, Primary Examiner

WALTER W. NIELSEN, Assistant Examiner

U.S. Cl. X.R.

35—8

PO-1050
(5/69)

UNITED STATES PATENT OFFICE
CERTIFICATE OF CORRECTION

Patent No. 3,460,270           Dated Aug. 12, 1969

Inventor(s) M. H. Blitz et al

It is certified that error appears in the above-identified patent and that said Letters Patent are hereby corrected as shown below:

Column 11, line 1, "possibility" should be --probability--; line 23, "Equations" should be --Equation--; line 47, the parenthesis mark between "pair" and "until" should be reversed; line 52, the reference numeral "131" should be --132--.

SIGNED AND
SEALED
JAN 20 1970

(SEAL)
Attest:

Edward M. Fletcher, Jr.
Attesting Officer

WILLIAM E. SCHUYLER, JR.
Commissioner of Patents